United States Patent
Choi (10) Patent No.: US 10,486,052 B2
(45) Date of Patent: Nov. 26, 2019

(54) DRIVING MODE CHANGEABLE MOBILITY DEVICE

(71) Applicants: Hyundai Motor Company, Seoul (KR); Kia Motors Corporation, Seoul (KR)

(72) Inventor: Jae Young Choi, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 54 days.

(21) Appl. No.: 15/807,738

(22) Filed: Nov. 9, 2017

(65) Prior Publication Data

US 2018/0353840 A1 Dec. 13, 2018

(30) Foreign Application Priority Data

Jun. 9, 2017 (KR) ........................ 10-2017-0072659

(51) Int. Cl.
| | | |
|---|---|---|
| *A63C 17/00* | (2006.01) | |
| *A63C 17/12* | (2006.01) | |
| *B60K 7/00* | (2006.01) | |
| *A63C 17/01* | (2006.01) | |
| *B60K 17/34* | (2006.01) | |
| *B62B 5/00* | (2006.01) | |

(52) U.S. Cl.
CPC ............ *A63C 17/12* (2013.01); *A63C 17/015* (2013.01); *B60K 7/00* (2013.01); *B60K 7/0007* (2013.01); *B60K 17/358* (2013.01); *B62B 5/0036* (2013.01); *A63C 17/008* (2013.01); *A63C 17/011* (2013.01); *A63C 2203/06* (2013.01); *A63C 2203/12* (2013.01); *A63C 2203/24* (2013.01); *B60Y 2200/81* (2013.01)

(58) Field of Classification Search
CPC ....... A63C 17/12; A63C 17/015; A63C 17/01; A63C 17/14; A63C 17/008; A63C 17/011
See application file for complete search history.

(56) References Cited

U.S. PATENT DOCUMENTS 4,295,547 A * 10/1981 Dungan ............. A63C 17/1427
188/2 D
5,020,621 A * 6/1991 Martin ................... A63C 17/01
180/180
5,864,333 A * 1/1999 O'Heir ................... A63C 17/12
180/181

(Continued)

FOREIGN PATENT DOCUMENTS

| KR | 10-1320958 | 10/2013 |
| KR | 10-2014-0073069 | 6/2014 |
| KR | 10-1539027 | 7/2015 |

*Primary Examiner* — Hau V Phan
(74) *Attorney, Agent, or Firm* — Mintz Levin Cohn Ferris Glovsky and Popeo, P.C.; Peter F. Corless (57) ABSTRACT

A mobility device is provided and includes a base panel that supports a passenger. A plurality of wheels are disposed at a plurality of points of the base panel and are coupled to the base panel to be rotated with respect to a vertical axis. A rotary portion provides a rotational force to rotate the wheel with respect to the base panel. Additionally, a braking portion is disposed on the rotary portion to adjust the plurality of wheels to be rotated with respect to the base panel or positions of the plurality of wheels to be fixed.

16 Claims, 4 Drawing Sheets

(56) References Cited

U.S. PATENT DOCUMENTS

| | | | | |
|---|---|---|---|---|
| 6,123,348 A * | 9/2000 | Miller | ............... | A63C 17/0046 188/22 |
| 6,488,296 B2 * | 12/2002 | Ireton | ................. | A63C 17/1427 188/72.9 |
| 6,592,486 B1 * | 7/2003 | Arbanas | ................. | B60K 6/365 475/107 |
| 6,647,719 B2 * | 11/2003 | Truninger | ................ | F15B 1/024 60/414 |
| 6,655,936 B2 * | 12/2003 | Szeszulski | .......... | F01C 21/0863 418/132 |
| 6,659,480 B1 * | 12/2003 | Newman | ................ | A63C 17/01 188/74 |
| 6,820,881 B1 * | 11/2004 | Berry | .................... | A63C 17/01 180/20 |
| 7,134,223 B2 * | 11/2006 | Ganon | .................... | A43B 9/06 36/12 |
| 7,159,879 B2 * | 1/2007 | Cole | ...................... | A63C 17/01 280/11.204 |
| 7,216,876 B2 * | 5/2007 | Cole | ...................... | A63C 17/01 280/43.23 |
| 7,635,136 B2 * | 12/2009 | Cole | ...................... | A63C 17/12 180/165 |
| 8,251,384 B1 * | 8/2012 | Christensen | ......... | A63C 17/015 280/11.115 |
| 8,371,594 B2 * | 2/2013 | Palmer | .................. | A63C 17/01 280/11.215 |
| 9,004,213 B2 * | 4/2015 | Larson | ................. | A63C 17/012 180/181 |
| 9,132,338 B2 * | 9/2015 | Cassidy | ............. | A63C 17/0046 |
| 9,504,902 B1 * | 11/2016 | Johnson | ................ | A63C 17/14 |
| 9,504,903 B2 * | 11/2016 | Newman | ........... | A63C 17/1427 |
| 9,616,318 B2 * | 4/2017 | Rogers | ................... | A63C 17/12 |
| 2013/0081891 A1 * | 4/2013 | Ulmen | .................... | A63C 17/12 180/181 |

\* cited by examiner

FIG. 1A

<LOW SPEED / INDOOR DRIVING MODE>

FIG. 1B

<HIGH SPEED / OUTDOOR DRIVING MODE>

DRIVING MODE CHANGEABLE MOBILITY DEVICE

CROSS REFERENCE TO RELATED APPLICATION

The present application claims priority to Korean Patent Application No. 10-2017-0072659, filed on Jun. 9, 2017, the entire contents of which is incorporated herein for all purposes by this reference.

BACKGROUND

1. Technical Field

The present invention relates to a driving mode changeable mobility device, and more particularly, to a small mobility device capable of changing a driving direction to a right angle by changing a phase of a wheel coupled to a base panel by 90°.

2. Description of the Related Art

Recently, small mobility devices are being developed as personal transport equipment. In general, these mobility devices are mostly configured to have one or two wheels. However, a small mobility device with four wheels has the advantage of being physically stable and robust against malfunctions of control. In the mobility device with four wheels, an inter-axis distance, that is, a distance between a center of a front wheel and a center of a rear wheel is an important consideration.

In other words, the greater the inter-axis distance, the more accurate the linear driving performance, but a turning radius becomes long at the time of turning and therefore cornering in a narrow alley is difficult. On the contrary, when the inter-axis distance is minimal, since the turning radius is short, cornering in a narrow alley is easier and thus, parking of a small mobility device or the like also becomes easier, but linear driving performance decreases and thus the small mobility device is inappropriate for high speed driving.

As the inter-axis distance decreases, the small mobility devices with four wheels become more suitable for low speed driving indoors. Additionally, as the inter-axis distance increases, the small mobility devices with four wheels become more suitable for high speed driving at high speed outdoors. Therefore, there has been a problem that the mobility device suitable for low speed driving and the mobility suitable for high speed driving have to be designed differently.

The matters described as the background art have been provided merely for assisting in the understanding for the background of the present invention and should not be considered as corresponding to the related art known to those skilled in the art.

SUMMARY

An object of the present invention is to provide a driving mode changeable mobility device that changes a phase of a wheel coupled to a base panel of the mobility device by 90° to change a driving direction, thereby changing a driving mode to a low speed driving mode and a high speed driving mode.

According to an exemplary embodiment of the present invention, a mobility device may include: a base panel configured to support a passenger; a plurality of wheels disposed at a plurality of points of the base panel and coupled to the base panel to be rotated with respect to a vertical axis; a rotary portion configured to provide a rotational force to rotate the wheel with respect to the base panel; and a braking portion disposed on a rotary portion to control the plurality of wheels to be rotated with respect to the base panel or positions of the plurality of wheels to be fixed.

A driving direction of the base panel may be changed by a rotation of the wheel by rotating the braking portion clockwise or counterclockwise. The mobility device may further include: a controller (e.g., a fust controller) configured to adjust a rotation of the braking portion, in which the base panel may have a rectangular shape including a long side and a short side, the plurality of wheels may be disposed at each edge of the base panel, and the controller may be configured to adjust the rotation of the braking portion in a high speed mode to adjust each wheel to be horizontal to the long side of the base panel and adjust the rotation of the braking portion in a low speed mode to adjust each wheel to be horizontal to the short side of the base panel.

The wheel may be positioned at an outside of an edge of the base panel, a rotational axis in a vertical direction may be positioned at an inside of the edge of the base panel, and the edge of the base panel may be bent in an arc shape not to interfere with the edge of the base panel when the wheel is rotated. The plurality of wheels may each include driving motors that drive each wheel independently. The mobility device may further include: a controller (e.g., a second controller) configured to operate a plurality of driving motors, in which the controller may be configured to adjust a rotational speed of each of the driving motors to be different to steer the base panel. The first and second controllers may be integrated as a single controller.

The base panel may include a plurality of force sensors and the controller may be steered based on a difference between values sensed by the plurality of force sensors. The plurality of force sensors may be disposed at a location where a passenger's foot is supported in the base panel. The plurality of force sensors may include a left sensor disposed where a left foot of a passenger is supported and a right sensor disposed where a right foot of a passenger is supported.

The left sensor may be configured to include a left front sensor disposed in front of where the left foot of the passenger is supported and a left rear sensor disposed at the rear thereof, and the right sensor may be configured to include a right front sensor disposed in front of where the right foot of the passenger is supported and a right rear sensor disposed at the rear thereof. The controller may be configured to steer (e.g., adjust) left-right directions of the base panel based on the difference between the a value sensed by the left sensor and a value sensed by the right sensor, and forward or rearward movement of the base panel may be adjusted based on the difference between a value sensed by the left front sensor and the right front sensor and a value sensed by the left rear sensor and the right rear sensor.

The rotary portion may include a rotating body, a link, and a braking portion. In particular, the rotating body may be disposed on each wheel and coupled to the base panel via a vertical axis to rotate the wheel when the rotating body is rotated and the braking portion, the braking portion may be rotated on the base panel, and the link may be configured to transfer a rotational force of the braking portion to each rotating body to rotate a rotating body. The rotary portion may further include a straight portion (e.g., a linear portion)

provided to correspond to each rotating body, and the straight portion may be connected to the rotating body and may be configured to move linearly to rotate the rotating body.

A straight portion coupling body may be formed by coupling a plurality of straight portions connected to a plurality of adjacent rotating bodies, respectively. A first end of the link may be coupled to the braking portion and a second end thereof may be coupled to the straight portion coupling body and the link and the straight portion coupling body may be configured to move linearly by the rotational force of the braking portion to rotate the rotating body. The rotary portion may further include a guide portion having a fust side coupled to the base panel and a second side coupled to the straight portion coupling body, and the guide portion may be configured to linearly guide the movement of the straight portion coupling body by the linear movement of the link. The rotary portion and the breaking portion may be disposed on the plurality of wheels, respectively to control each of the wheels to be rotated with respect to the base panel or the positions of each of the wheels to be fixed.

DETAILED DESCRIPTION

Hereinafter, exemplary embodiments of the present invention will be described with reference to the accompanying drawings.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1A:
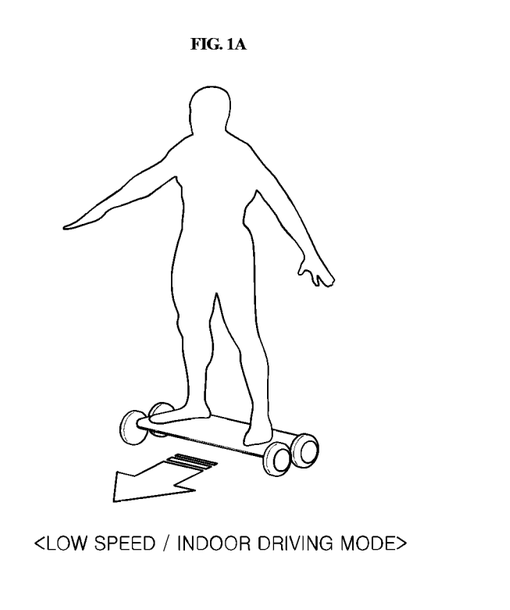
FIGS. 1A and 1B are diagrams showing two driving modes of a mobility device according to an exemplary embodiment of the present invention.
Figure 1B:
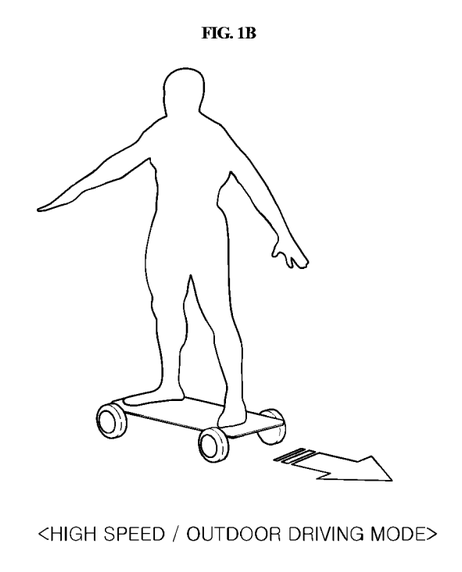

FIGS. 1A-1B are diagrams showing two driving modes of a mobility device according to an exemplary embodiment of the present invention. The mobility device discussed herein may be referred to as a small mobility device merely being an indication of the relatively small size of the mobility device on which one person is capable of standing. FIG. 1A shows a mode in which a small mobility device drives at a low speed indoors, and FIG. 1B shows a mode in which a small mobility device drives at a high speed outdoors. As shown in the FIG. 1A, when a small mobility device drives while a wheel is fixed in a horizontal direction to a short side of a base panel, an inter-axis distance is short or minimal, thereby facilitating cornering in a narrow alley (e.g., making a turn), and as shown in the FIG. 1B, when a small mobility device drives while the wheel is fixed in a horizontal direction to a long side of the base panel, the inter-axis distance is longer, thereby improving the stability of linear driving. Incidentally, a mobility device drives a side surface having a relatively narrower area than a front surface of a passenger.

Figure 2:
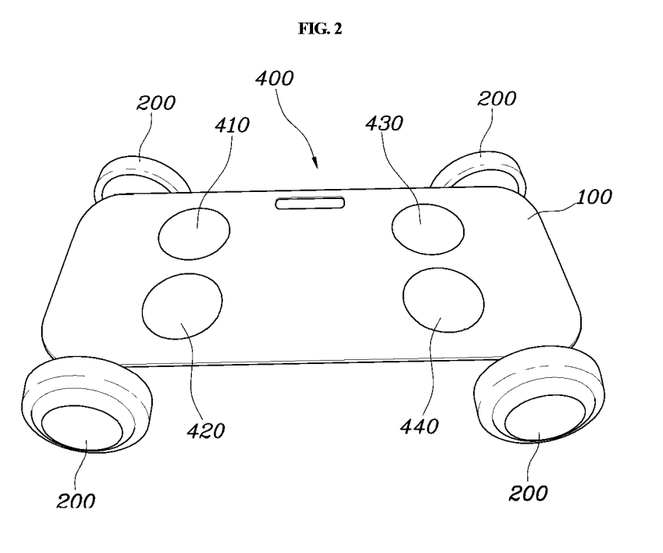
FIG. 2 is a top perspective view of a high speed mode state of a mobility device according to an exemplary embodiment of the present invention.
Figure 3:
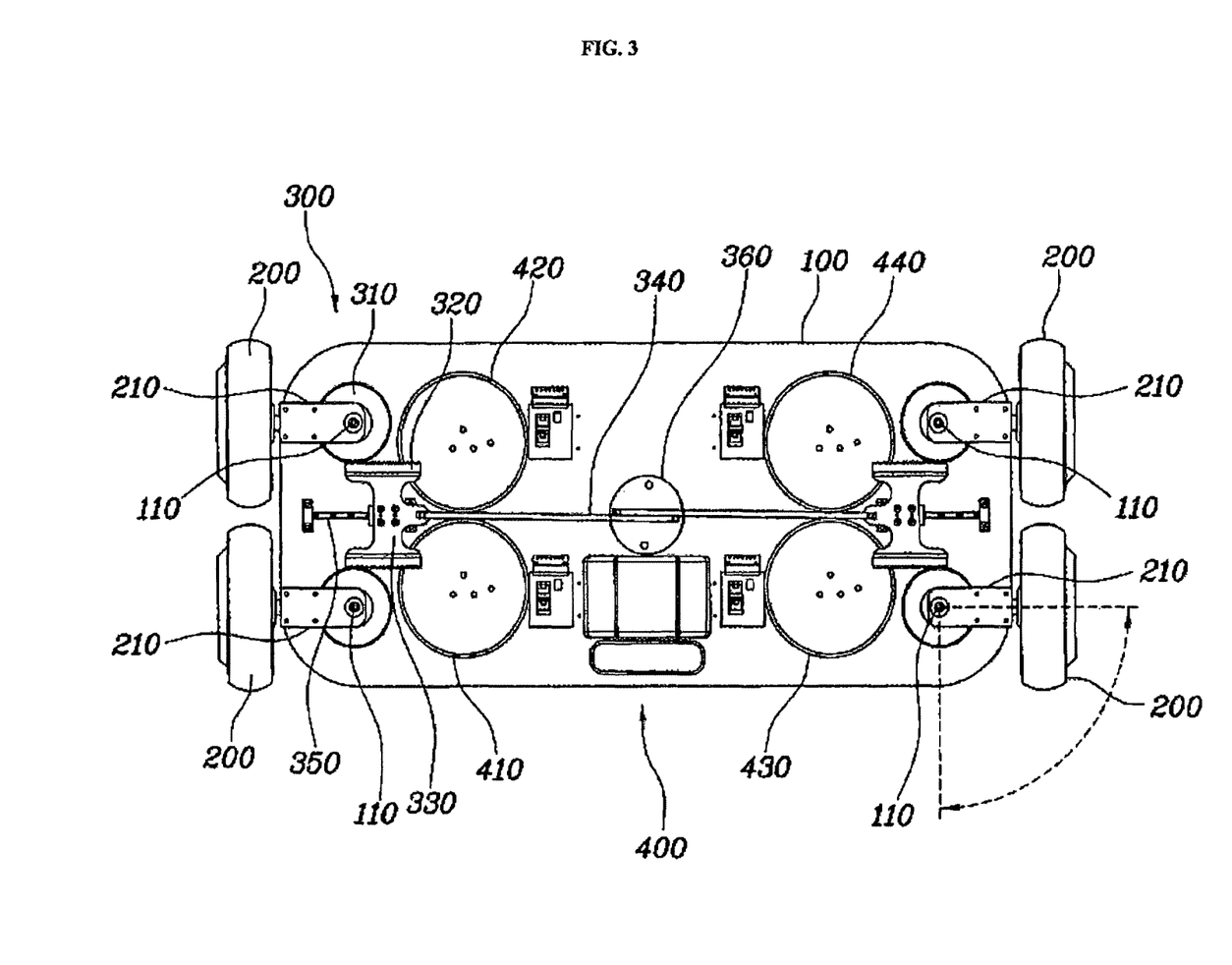
FIG. 3 is a bottom view of a low speed mode state of a mobility device according to an exemplary embodiment of the present invention.

FIG. 2 is a top perspective view of a high speed mode state of a mobility device according to an exemplary embodiment of the present invention and FIG. 3 is a bottom view of a low speed mode state of a mobility device according to an exemplary embodiment of the present invention. Referring to FIGS. 2 to 3, the mobility device according to the present invention may include a base panel 100 that supports a passenger; a plurality of wheels 200 disposed at a plurality of points of the base panel 100, respectively and coupled to the base panel 100 to be rotated with respect to a vertical axis; a rotary portion 300 that provides a rotational force to rotate the wheel 200 with respect to the base panel 100; and a braking portion 360 disposed on the rotary portion and configured to operate and adjust the plurality of wheels to be rotated with respect to the base panel or positions thereof to be fixed to the base panel.

The base panel 100 supports boarding (e.g., boarding of a user onto the device), and is generally configured of a footstool on which a passenger rides while standing up and configured to support the feet of a passenger. However, the base panel 10 may also be designed to allow a passenger to sit on the base panel 10 during operation. A driving direction of the base panel 100 may be changed by a rotation of the wheel 200 by rotating the braking portion 360 clockwise or counterclockwise.

According to an exemplary embodiment, the base panel 100 may have a rectangular shape including a long side and a short side (e.g., a short side being shorter in length than the long side and the rectangular shape having two long sides and two short sides), and the plurality of wheels 200 may be disposed/mounted/coupled at each edge of the base panel 100 sequentially and thus may be formed in four. When the base panel 100 has the rectangular shape, the plurality of wheels 200 may be rotated at an angle of 90° inwardly of the edges of the base panel 100, and thus the driving direction may be changed at a right angle. More specifically, the mobility device may further include a controller (not shown) configured to adjust the rotation of the braking portion 360. In particular, the controller may be configured to adjust the rotation of the braking portion 360 in a high speed mode to cause each wheel 200 to be horizontal to the long side of the base panel 100 and may be configured to adjust the rotation of the braking portion 360 in a low speed mode to cause each wheel 200 to be horizontal to the short side of the base panel 100.

Accordingly, in the high speed mode, each wheel 200 may be horizontal to the long side of the base panel 100 to increase an inter-axis distance during linear operation of the device (e.g., driving), thereby improving linear driving performance. Additionally, in the low speed mode, each wheel 200 may be horizontal to the short side of the base panel 100 to decrease the inter-axis distance during the linear operation of the device (e.g., driving), thereby reducing a turning radius. The rotation control of the braking portion 360 may be performed to fix the braking portion 360 during operate and to rotate the braking portion 360 only when the wheel stops for safety. The control of the braking portion by the controller (not shown) may use a remote control or the like to perform a mode change between the high speed mode and the low speed mode. It may also be possible to rotate the braking portion 360 manually without the controller (not shown).

A change angle of the driving direction may vary based on a shape, an edge angle or the like of the base panel 100. The edge of the base panel 100 may be bent in an arc shape, the wheel 200 may be positioned at an outside of the edge of the base panel 100, and a rotational axis in a vertical direction may be positioned at an inside of the edge of the base panel 100 to prevent the wheel 200 from interfering with the base panel 100 when being rotated. When the rotational axis in the vertical direction of the wheel 200 is positioned inwardly of the edge of the base panel 100, the edge of the base panel 100 may be bent in an arc shape to prevent the wheel 200 from interfering with the edge of the base panel 100 when the wheel 200 is rotated. Additionally, the turning radius in the vertical direction of the wheel 200 and an arc radius of the edge of the base panel 100 may substantially coincide with each other.

Furthermore, the plurality of wheels 200 may each include with driving motors (not shown) configured to independently drive the respective wheels 200. An in-wheel motor may be mounted inside each of the plurality of wheels 200, and thus the wheel 200 may be driven independently. The mobility device may further include the controller configured to operate the plurality of driving motors (not shown), in which the controller may be configured to adjust the rotational speed of each of the driving motors to be different, thereby steering the base panel 100. The controller may be provided separately in each of the driving motors configured to independently drive the plurality of wheels 200 to adjust the rotational speed of each driving motor and the wheel 200. Alternatively, the controller may be configured to operate the plurality of driving motors to adjust the rotational speeds of the respective driving motors and the wheel 200.

The base panel 100 may include a plurality of force sensors 400 and the controller may be configured to steer the base panel 100 based on a difference between values sensed by the plurality of force sensors 400. The plurality of force sensors 400 may be disposed at a location where a passenger's foot is supported on the base panel 100 and may be provided as a 1-axis force sensor configured to measure a vertical direction to measure a force in a vertical direction by a passenger's weight. The plurality of force sensors 400 may include left sensors 410 and 420 disposed at a location where a left foot of a passenger is supported and right sensors 430 and 440 disposed at a location where a right foot of a passenger is supported on the base panel 100. Additionally, the left-right directions of the base panel may be made based on a difference in values sensed by the left sensors 410 and 420 and the right sensors 430 and 440. The sensors may be disposed in front of and in back of the passenger's foot, respectively, and the controller may be configured to adjust the forward or rearward movement of the mobility device based on the difference between the values sensed by the front sensors 410 and 430 and the rear sensors 420 and 440.

As the difference between the values sensed by the front sensors 410 and 430 and the rear sensors 420 and 440 increases, a speed of the forward or rearward movement may be rapidly adjusted. Specifically, the left sensors 410 and 420 may include a left front sensor 410 disposed in front of a part and a left rear sensor 420 disposed at the rear thereof, where the left foot of the passenger is supported, and the right sensors 430 and 440 may include a right front sensor 430 disposed in front of a part and a right rear sensor 440 disposed at the rear thereof, where the right foot of the passenger is supported on the mobility device.

The controller (not shown) may be configured to steer and adjust the left-right directions of the base panel based on the difference between the values sensed by the left sensors 410 and 420 and the values sensed by the right sensors 430 and 440. Further, the forward movement or rearward movement of the base panel may be adjusted based on the difference between the values sensed by the left front sensor 410 and the right front sensor 430 and the values sensed by the left rear sensor 420 and the right rear sensor 440. The controller may further be configured to adjust the speed of the forward or rearward movement as the difference between the values sensed by the front sensors 410 and 430 and the values sensed by the rear sensors 420 and 440 increases.

From the above description, it is apparently understood by those skilled in the art that FIG. 3 shows left/right and front/rear directions when the wheel 200 is fixed in a horizontal direction to the short side of the base panel 100 and FIG. 2 shows the change in the left/right and front/rear directions when the wheel 200 is fixed in the horizontal direction to the long side of the base panel 100.

The rotary portion 300 may include a rotating body 310, a straight portion 320, a straight portion assembly 330, a link 340, and a braking portion 360. The rotating body 310 may be disposed on each wheel 200 via a knuckle 210 and the rotating body 310 may be coupled to the base panel 100 via a vertical axis 110, and thus, the wheel 200 may be rotated when the rotating body 310 is rotated. The straight portion 320 may correspond to each of the rotating bodies 310 and may be configured to move linearly while being connected to the rotating body 310 to rotate the rotating body 310. As shown, the rotating body 310 and the straight portion 320 may each be configured of a pinion gear and a rack gear, and may be configured of various systems in which linear movement is converted into rotary movement, such as a system using friction force or a system using a wire.

A straight portion coupling body 330 may be formed by coupling the plurality of straight portions 320 connected to a plurality of adjacent rotating bodies, respectively. As shown in FIG. 3, the straight portion coupling body 330 may be formed by coupling the straight portions 320 positioned on the left and right sides, or the straight portion coupling body may be formed by coupling straight portions positioned on the front and rear sides. In particular, the adjacent straight portions 320 may be configured to move in the same direction by the same length to simplify the configuration of the link.

The braking portion 360 may be rotated on the base panel 100 and the link 340 may have a first end coupled to the braking portion 360 and a second end coupled to the straight portion coupling body 330. Accordingly, the link 340 and the straight portion coupling body 330 may be configured to move linearly by the rotational force of the braking portion 360, and thus, the rotating body 310 may be rotated and the connected wheel 200 may be thus rotated with respect to the vertical axis. The rotary portion 300 may further include a guide portion 350 having a fust side coupled to the base panel 100 and a second side coupled to the straight portion coupling body 330. The guide portion 350 may be configured to linearly guide the movement of the straight portion coupling body 330 by the linear movement of the link 340.

When the link 340 moves linearly due to the rotation of the braking portion 360, the rotational angle is generated in proportion to the turning radius of the braking portion 360, and thus, the link 340 is unable move completely linearly but moves while being rotated. Accordingly, to compensate for the generation of the rotational angle due to the rotation of the braking portion 360, the guide portion 350 may be further provided to allow the straight portion coupling body 330 to move linearly without being rotated and the link 340 may be rotatably coupled to the braking portion 360 and the straight portion coupling body 330, respectively, by a hinge or the like to allow the straight portion coupling body 330 to move linearly along the guide portion 350. The guide portion 350 may have a separate structure in which one side is coupled to the base panel 100 or the guide portion 350 may also be formed by forming grooves on the base panel 100 along a movement path of the straight portion coupling body 330.

Although not shown in FIG. 3, according to another exemplary embodiment, the rotary portion and the breaking portion may be disposed on the plurality of wheels 200, respectively to operate each of the wheels 200 to be rotated with respect to the base panel 100 or the positions of each of the wheels 200 to be fixed.

According to the driving mode changeable mobility device of the present invention, the cornering may be executed successfully in a narrow space through the driving mode in which the inter-axis distance is minimal when the a mobility device drives at low speed indoors and the straight stability may be improved through the driving mode in which the inter-axis distance is increased when the mobility device drives at high speed outdoors, such that the mobility device may be used indoors and outdoors. Further, the phase of the wheel may be fixed during the driving by the braking portion, thereby changing the driving mode more stably.

Although the present invention has been shown and described with respect to specific exemplary embodiments, it will be obvious to those skilled in the art that the present invention may be variously modified and altered without departing from the spirit and scope of the present invention as defined by the following claims.

What is claimed is:

1. A driving mode changeable mobility device, comprising:
   a base panel to support a passenger thereon, having a substantially rectangular shape;
   a plurality of wheels, each of which is connected to a vertical axis through a knuckle, the vertical axis being disposed on each corner area of the base panel in vertical position with respect to the surface of the base panel, so that each of the plurality of wheels together with a corresponding knuckle rotate around the vertical axis;
   a rotary portion configured to rotate the plurality of wheels around the vertical axis, comprising a braking portion configured to control the plurality of wheels to be rotated or fixed with respect to the base panel.

2. The driving mode changeable mobility device of claim 1, wherein a driving direction of the base panel is changed by a rotation of the wheel with the corresponding knuckle by rotating the braking portion clockwise or counterclockwise.

3. The driving mode changeable mobility device of claim 1, further comprising:
   a controller configured to adjust a rotation of the braking portion,
   wherein the substantially rectangular shape of the base panel includes a long side and a short side, the plurality of wheels are disposed at each edge of the base panel, and the controller is configured to adjust the rotation of the braking portion in a high speed mode to cause each wheel to be horizontal to the long side of the base panel and adjust the rotation of the braking portion in a low speed mode to cause each wheel to be horizontal to the short side of the base panel.

4. The driving mode changeable mobility device of claim 1, wherein the wheel is positioned at an outside of a corner of the base panel, a rotational axis in a vertical direction is positioned at an inside of the corner of the base panel, and the corner of the base panel is bent in an arc shape to prevent the base panel from interfering with the corner of the base panel when the wheel is rotated.

5. The driving mode changeable mobility device of claim 1, wherein the plurality of wheels each include a driving motor configured drive each wheel independently.

6. The driving mode changeable mobility device of claim 5, wherein the controller is configured to operate each driving motor and adjust a rotational speed of each driving motor to be different to steer the base panel.

7. The driving mode changeable mobility device of claim 6, wherein the base panel includes a plurality of force sensors and the controller is configured to steer the base panel based on a difference between values sensed by the plurality of force sensors.

8. The driving mode changeable mobility device of claim 7, wherein the plurality of force sensors are disposed at a location where a passenger's foot is supported on the base panel.

9. The driving mode changeable mobility device of claim 8, wherein the plurality of force sensors include a left sensor disposed at a location where a left foot of a passenger is supported and a right sensor disposed at a location where a right foot of the passenger is supported.

10. The driving mode changeable mobility device of claim 9, wherein the left sensor includes a left front sensor disposed in front of the part and a left rear sensor disposed at the rear thereof, where the left foot of the passenger is supported, and the right sensor includes a right front sensor disposed in front of the part and a right rear sensor disposed at the rear thereof, where the right foot of the passenger is supported.

11. The driving mode changeable mobility device of claim 10, wherein the controller is configured to steer the base panel to the left or right based on a difference between values sensed by the left front sensor and the left rear sensor and values sensed by the right front sensor and the right rear sensor, and forward or rearward movement of the base panel is adjusted based on a difference between values sensed by the left front sensor and the right front sensor and values sensed by the left rear sensor and the right rear sensor.

12. The driving mode changeable mobility device of claim 1, wherein the rotary portion includes a rotating body, a link, and the braking portion, and the rotating body is disposed on each wheel and coupled to the base panel via the vertical axis to rotate the wheel when the rotating body is rotated, the braking portion is rotated on the base panel, and the link is configured to transfer a rotational force of the braking portion to each rotating body to rotate the rotating body.

13. The driving mode changeable mobility device of claim 12, wherein the rotary portion further includes a straight portion that corresponds to each rotating body, and the straight portion is connected to the rotating body and is configured to move linearly to rotate the rotating body.

14. The driving mode changeable mobility device of claim 13, wherein a straight portion coupling body is formed by coupling a plurality of straight portions connected to a plurality of adjacent rotating bodies, respectively, a first end of the link is coupled to the braking portion and a second end thereof is coupled to the straight portion coupling body, and the link and the straight portion coupling body move linearly by the rotational force of the braking portion to rotate the rotating body.

15. The driving mode changeable mobility device of claim 14, wherein the rotary portion further includes a guide portion having a first side coupled to the base panel and a second side coupled to the straight portion coupling body, and the guide portion linearly guides the movement of the straight portion coupling body by the linear movement of the link.

16. The driving mode changeable mobility device of claim 1, wherein the rotary portion and the breaking portion are disposed on the plurality of wheels, respectively to operate each of the wheels to be rotated with respect to the base panel or the positions of each of the wheels to be fixed.

* * * * *